Jan. 12, 1932. J. SOUSEDÍK 1,840,473
ALTERNATING CURRENT COMMUTATOR MOTOR
Filed May 28, 1928
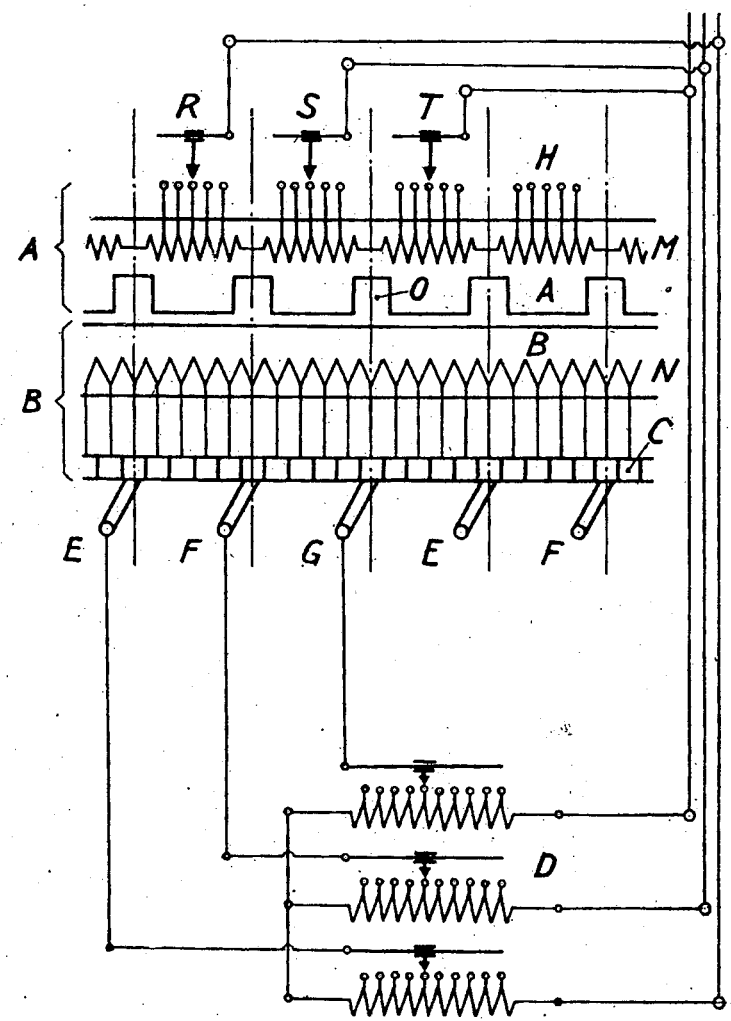
J. Sousedík
INVENTOR
By: Marks & Clerk
ATT'YS.

UNITED STATES PATENT OFFICE

JOSEF SOUSEDÍK, OF VSETIN, CZECHOSLOVAKIA

ALTERNATING CURRENT COMMUTATOR MOTOR

Application filed May 28, 1928, Serial No. 281,228, and in Czechoslovakia June 27, 1927.

This invention relates to an improved single or multiphase commutator motor, the object of the invention being to provide a construction which will allow the speed of the motor to be readily regulated without any sparking taking place at the commutator, although the brushes are kept in a fixed position.

The brushes of a single or multiphase commutator motor are kept in a fixed position and the stator is provided with a number of radial recesses corresponding to the number of the brushes or poles, the said recesses lying opposite the parts of the rotor where the rotor windings are short-circuited by the said fixed brushes, so that no currents are induced in the said short-circuited windings.

In this way the voltage between the commutator segments is reduced to a minimum, and the admissible commutator voltage can be increased without in any way impairing the sparkless commutation.

The width of the said radial recesses in the stator is made equal to the width of the brushes.

The stator may be wound in the same way as in the case of a continuous current machine and is provided with a plurality of tappings for each phase in order to adjust the phase as required for the speed regulation. The voltage supplied to the rotor over the brushes and commutator is varied according to the speed required by means of an auto-transformer or induction regulator.

Referring to the accompanying drawing, which illustrates the invention diagrammatically and by way of example as applied to a three-phase commutator motor, A is the stator which is provided with a winding M having three groups of tappings $H_1$, $H_2$, $H_3$. R, S, T, are three movable contacts of a controlling switch by means of which the phase is adjusted with respect to the rotor. B is the rotor which is provided with the usual winding N and commutator C.

According to the invention, the brushes E, F, G, are kept in a fixed position on the commutator and the parts of the stator A facing the parts of the rotor N where the rotor windings are short-circuited by the brushes, are radially recessed as shown at O, the width of the recesses corresponding to the width of the brushes.

The brushes are connected to the supply circuit through the intermediary of an adjustable auto-transformer D, or induction regulator, in order to obtain a gradual regulation.

The starting of the motor is as follows:

Before the current is switched on, the auto-transformer or induction regulator is so adjusted that its voltage will correspond to the voltage induced in the rotor; the current is then switched on and the motor is started by reducing the voltage by means of the auto-transformer or induction regulator until it reaches synchronous speed or exceeds the same when the rotor voltage is increased.

What I claim is:

An alternating current commutator motor comprising a stator and a rotor, the said stator having radial recesses forming relatively large air gaps, a commutator on said rotor, fixed brushes in contact with said commutator at points facing said recesses, and a delta connected winding on said stator with a plurality of taps for each phase for phase adjustment.

In testimony whereof I have signed my name to this specification.

JOSEF SOUSEDÍK.